(12) United States Patent
Beach et al.

(10) Patent No.: US 12,429,376 B2
(45) Date of Patent: Sep. 30, 2025

(54) HYPERSPECTRAL IMAGING OF MOVING MICROSCOPIC SAMPLE ELEMENTS

(71) Applicant: CYTOVIVA, INC., Auburn, AL (US)

(72) Inventors: James Melvin Beach, Lady Lake, FL (US); James Lawrence Uertz, Atlanta, GA (US); Andrew Liu, Auburn, AL (US); Byron J. Cheatham, Auburn, AL (US); Samuel M. Lawrence, Seattle, WA (US)

(73) Assignee: CYTOVIVA, INC., Auburn, AL (US)

( * ) Notice: Subject to any disclaimer, the term of this patent is extended or adjusted under 35 U.S.C. 154(b) by 0 days.

(21) Appl. No.: 18/712,579

(22) PCT Filed: Nov. 21, 2022

(86) PCT No.: PCT/US2022/080243
§ 371 (c)(1),
(2) Date: May 22, 2024

(87) PCT Pub. No.: WO2023/092123
PCT Pub. Date: May 25, 2023

(65) Prior Publication Data
US 2025/0060252 A1    Feb. 20, 2025

Related U.S. Application Data

(60) Provisional application No. 63/281,844, filed on Nov. 22, 2021.

(51) Int. Cl.
*H04N 23/10* (2023.01)
*G01J 3/04* (2006.01)
(Continued)

(52) U.S. Cl.
CPC . *G01J 3/32* (2013.01); *G01J 3/04* (2013.01); *G06V 10/58* (2022.01); *G06V 20/46* (2022.01); *G06V 20/693* (2022.01); *H04N 23/10* (2023.01)

(58) Field of Classification Search
USPC .......................................................... 348/79
See application file for complete search history.

(56) References Cited

U.S. PATENT DOCUMENTS

| | | | |
|---|---|---|---|
| 2009/0020714 A1* | 1/2009 | Slinger | H04N 25/00 250/550 |
| 2012/0062883 A1* | 3/2012 | Asher | G02B 5/208 528/30 |

(Continued)

OTHER PUBLICATIONS

International Search Report for PCT/US22/80243 mailed Mar. 8, 2023.

*Primary Examiner* — Nigar Chowdhury
(74) *Attorney, Agent, or Firm* — Thomas | Horstemeyer, LLP

(57) ABSTRACT

Various examples are provided related to hyperspectral imaging of moving microscopic sample elements. In one example, a method for hyperspectral imaging includes acquiring a series of optical images and corresponding hyperspectral data of a sample; compiling a movie comprising a series of frames each including one of the series of optical images and a slit line indicating a location of a slit for acquisition of the hyperspectral data; identifying a frame comprising an element of the sample located on the slit line; and analyzing the hyperspectral data corresponding to the optical image in the identified frame. Each optical image and its corresponding hyperspectral data are acquired simultaneously and identified by a time stamp or sequence number. The analysis can generate hyperspectral information about the element. In another example, a system for hyperspectral (Continued)

imaging includes a hyperspectral imaging device; an optical imaging device; and a computing device.

20 Claims, 5 Drawing Sheets

(51) Int. Cl.
    *G01J 3/32*           (2006.01)
    *G06V 10/58*         (2022.01)
    *G06V 20/40*         (2022.01)
    *G06V 20/69*         (2022.01)

(56) References Cited

U.S. PATENT DOCUMENTS

| | | | |
|---|---|---|---|
| 2014/0005484 A1 | 1/2014 | Charles | |
| 2014/0055784 A1* | 2/2014 | Kremer | G01J 3/1804 |
| | | | 356/302 |
| 2016/0066775 A1* | 3/2016 | Hunter | G01J 3/1256 |
| | | | 600/178 |
| 2018/0365535 A1* | 12/2018 | Gesley | G06V 30/194 |
| 2019/0323888 A1* | 10/2019 | Streuber | H04N 23/67 |
| 2020/0005455 A1* | 1/2020 | Alshurafa | G01N 21/27 |
| 2020/0397300 A1* | 12/2020 | Talbert | H04N 23/125 |
| 2021/0075978 A1* | 3/2021 | Sowa | A61B 5/0035 |

\* cited by examiner

HYPERSPECTRAL IMAGING OF MOVING MICROSCOPIC SAMPLE ELEMENTS

CROSS REFERENCE TO RELATED APPLICATIONS

This application is the 35 U.S.C. § 371 national stage application of PCT Application No. PCT/US2022/080243, filed Nov. 21, 2022, which claims priority to, and the benefit of, U.S. provisional application entitled "HYPERSPECTRAL IMAGING OF MOVING MICROSCOPIC SAMPLE ELEMENTS", having Ser. No. 63/281,844, filed Nov. 22, 2021, which are both hereby incorporated by reference herein in their entireties.

BACKGROUND

Research of microscopic particles is often carried out with samples disposed on slides. It is extremely difficult to capture data from moving samples on a slide. This is especially true for hyperspectral imaging of moving particles.

SUMMARY

Aspects of the present disclosure are related to hyperspectral imaging of moving microscopic sample elements. In one aspect, among others, a method for hyperspectral imaging, comprising: acquiring a series of optical images and corresponding hyperspectral data of a sample, each optical image and its corresponding hyperspectral data acquired simultaneously and identified by a time stamp or sequence number; compiling a movie comprising a series of frames each including one of the series of optical images and a slit line indicating a location of a slit for acquisition of the hyperspectral data; identifying a frame comprising an element of the sample located on the slit line; and analyzing the hyperspectral data corresponding to the optical image in the identified frame, the analysis generating hyperspectral information about the element. The element can be in motion. The hyperspectral data can be acquired through hyperspectral imaging through the slit.

In one or more aspects, a defined number of optical images and corresponding hyperspectral data can be acquired. Each optical image can be acquired over a defined optical exposure time. The corresponding hyperspectral data can be acquired over a defined hyperspectral imaging (HSI) exposure time. Acquisition of each optical image and its corresponding hyperspectral data can be initiated simultaneously. The hyperspectral information can comprise a spectrum of the element. Analysis of the generated hyperspectral information can comprise a spectral profile.

In another aspect, a system for hyperspectral imaging, comprising: a hyperspectral imaging (HSI) device; an optical imaging device; at least one computing device comprising a processor and memory; and at least one application executable on the at least one computing device. When executed, the at least one application can cause the at least one computing device to at least: acquire a series of optical images and corresponding hyperspectral data of a sample, each optical image and its corresponding hyperspectral data acquired simultaneously by the optical imaging device and the HSI device and identified by a time stamp or sequence number; compile a movie comprising a series of frames each including one of the series of optical images and a slit line indicating a location of a slit of the HSI device for acquisition of the hyperspectral data; and analyzing the hyperspectral data corresponding to the optical image in a frame comprising an element of the sample located on the slit line, the analysis generating hyperspectral information about the element.

In one or more aspects, the HSI device can be a spectrograph. The hyperspectral data can be acquired through hyperspectral imaging through the slit. The optical imaging device can be a camera. A defined number of optical images and corresponding hyperspectral data can be acquired. The corresponding hyperspectral data can be acquired by the HSI imaging device over a defined HSI exposure time. Each optical image can be acquired by the optical imaging device over a defined optical exposure time. Acquisition of each optical image and its corresponding hyperspectral data can be initiated simultaneously. The HSI imaging device can trigger the optical imaging device for simultaneous acquisition of the optical image. The hyperspectral information can comprise a spectrum of the element. Analysis of the generated hyperspectral information can comprise a spectral profile.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
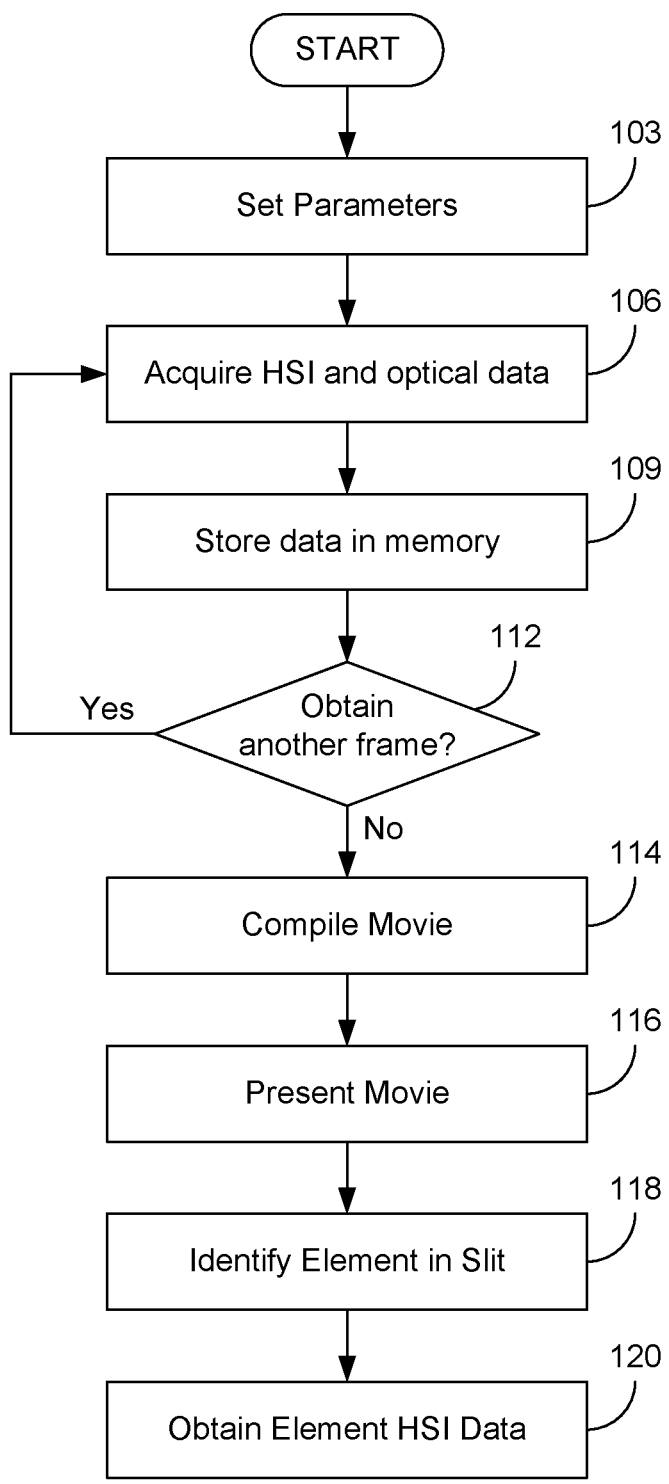
FIG. 1 is a flowchart illustrating an example of a methodology for hyperspectral imaging of moving microscopic sample elements, in accordance with various embodiments of the present disclosure.

Disclosed herein are examples related to hyperspectral imaging of moving microscopic sample elements such as, e.g., biologicals and/or inorganic particles. Reference will now be made in detail to the description of the embodiments as illustrated in the drawings, wherein like reference numbers indicate like parts throughout the several views.

Hyperspectral imaging can be used for spectral characterization and spectral mapping of nanoscale samples. The hyperspectral imaging can support a wide range of other types of samples, from micro to macro in scale. Systems are available for hyperspectral imaging of stationary particles, however moving elements or particles complicate the imaging. The disclosed process allows both hyperspectral and optical data to be captured simultaneously from moving samples. The optical data can be used to produce a movie or series of frames that can show sample elements as they move past the hyperspectral imaging slit. The time stamped or numbered frames can contain a marked line indicating the slit view from the spectrograph. When viewed, the time stamped frames allow the user to determine when a sample moves past the narrow imaging slit of the spectrograph. The hyperspectral information corresponding to the frames can be stored in hyperspectral datacubes, which can then be accessed for analysis.

Referring to FIG. 1, shown is a flowchart illustrating an example of the hyperspectral imaging methodology. Beginning at 103, parameters for the acquisition of the hyperspectral and optical data is established by, e.g., a user. The parameters can include, but are not limited to, hyperspectral imaging (HSI) exposure time (e.g., in msec), optical exposure time (e.g., in msec), objective setting, and/or number of scans (or HSI scans). The parameters can be set by a user through an interface, which can be configured to allow selection of one or more preset values. The interface may also allow the imaging to be flipped horizontally or vertically.

Figure 2:
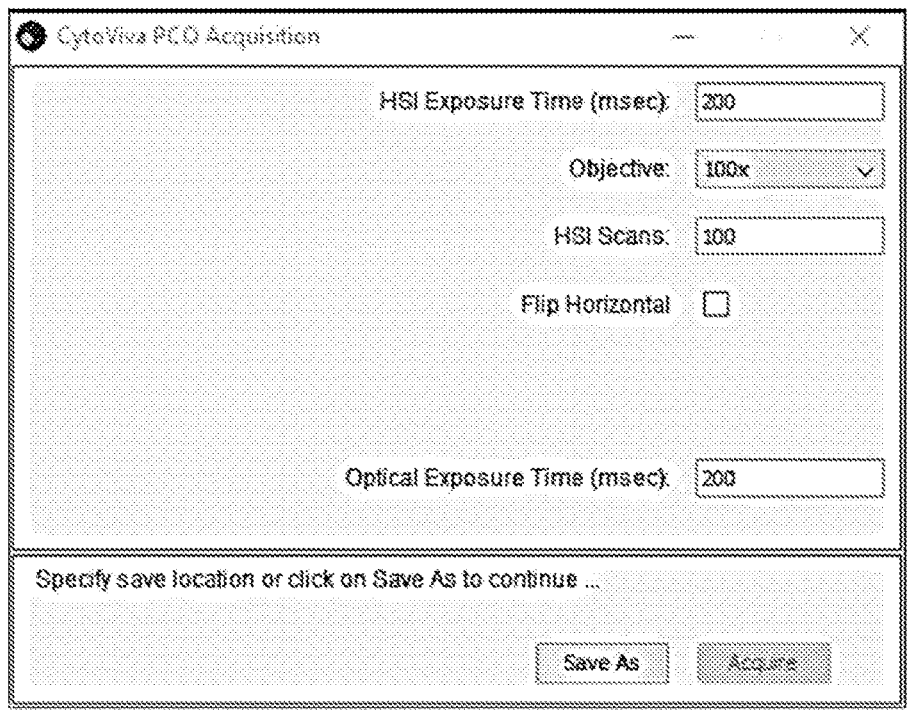
FIG. 2 is an example of an interface for setting parameters for hyperspectral and optical imaging, in accordance with various embodiments of the present disclosure.

FIG. 2 shows an example of an interface that facilitates independent setting of HSI and optical exposure times. The HSI and optical exposure times can be the same or different. The objective setting may be selected from a set of predefined setting and a number of scans (one or more) can be entered. The hyperspectral and optical imaging will wait until both exposures are complete before initiating imaging for the next frame. The interface can also allow the user to specify where the scan information is stored in memory. Once the parameters have been set, the hyperspectral imaging can be initiated by selecting the "acquire" button in the interface.

Referring back to FIG. 1, data acquisition can be initiated after the parameters have been set. At 106, an HSI datacube is acquired using a spectrograph and a corresponding optical image is acquired using an optical camera or other appropriate imaging device for a time stamped frame. The HSI datacube and optical image can be obtained simultaneously. For example, the device capturing the HSI data can trigger the optical imaging device to concurrently capture the corresponding image. This can be accomplished by, e.g., sending a TTL signal from a first device to the second device. The acquired HSI datacube and corresponding optical image can be stored in memory with a time stamp and/or frame number at 109. After capturing and storing the data, it can be determined at 112 whether another frame of HSI datacube and corresponding optical image should be obtained. This may be determined based upon, e.g., the number of scans specified at 103, a specified time period and exposure times and/or available memory space to store additional data.

After the HSI and optical data is captured, the stored frames can be compiled into a movie comprising the series of time stamped or numbered frames at 114. Each time stamped or numbered frame includes an optical image that is associated with the corresponding HSI datacube. The frame can include a marked line or other graphic that can indicate the location of the slit view of the spectrograph. The compiled movie can then be presented to a user at 116. The user can scan through the series of frames at 118 to identify a frame where a microscopic sample element (e.g., a particle) is in or aligned with the slit, indicating that HSI data was collected for the element in the corresponding HSI datacube. In some embodiments, the identification of an appropriately located sample element in a frame can be automated using, e.g., machine learning or other appropriate processing. Once a sample element is identified, the corresponding HSI datacube can be accessed at 120 to obtain the HSI data for that element.

Figure 3A:
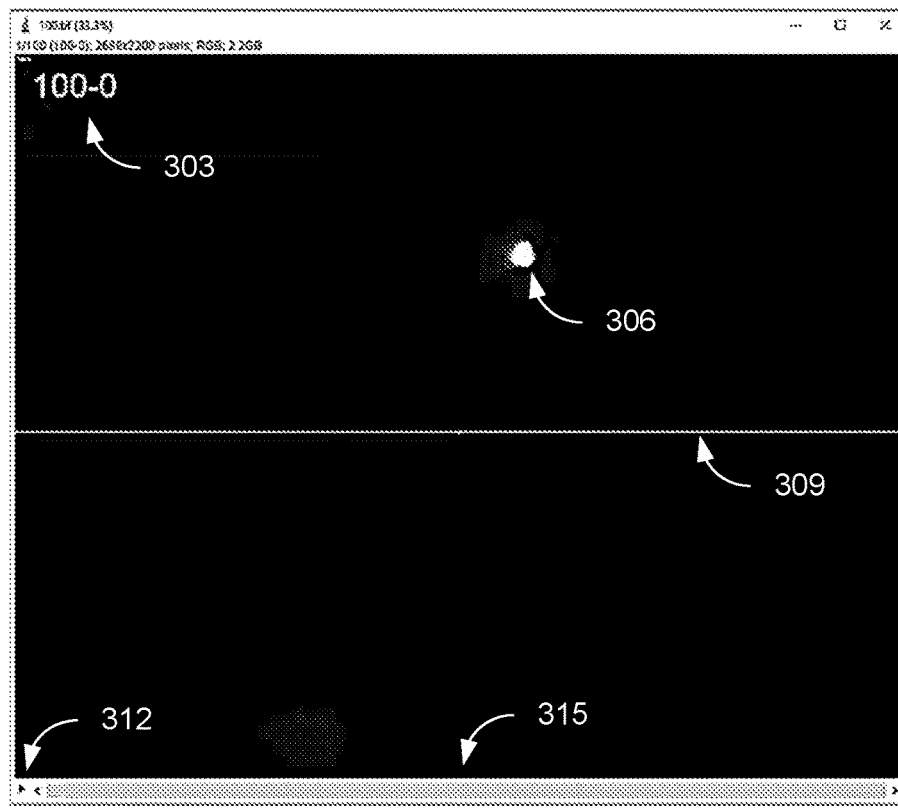
FIGS. 3A-3C are examples of time stamped or numbered frames from the hyperspectral and optical imaging, in accordance with various embodiments of the present disclosure.
Figure 3B:
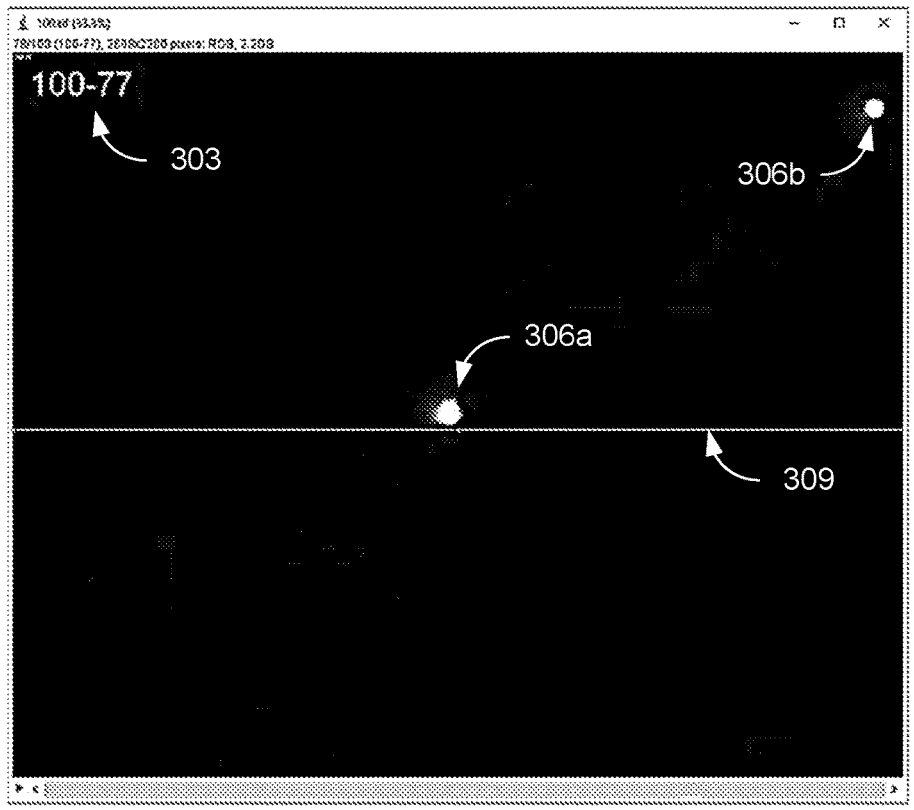
Figure 3C:
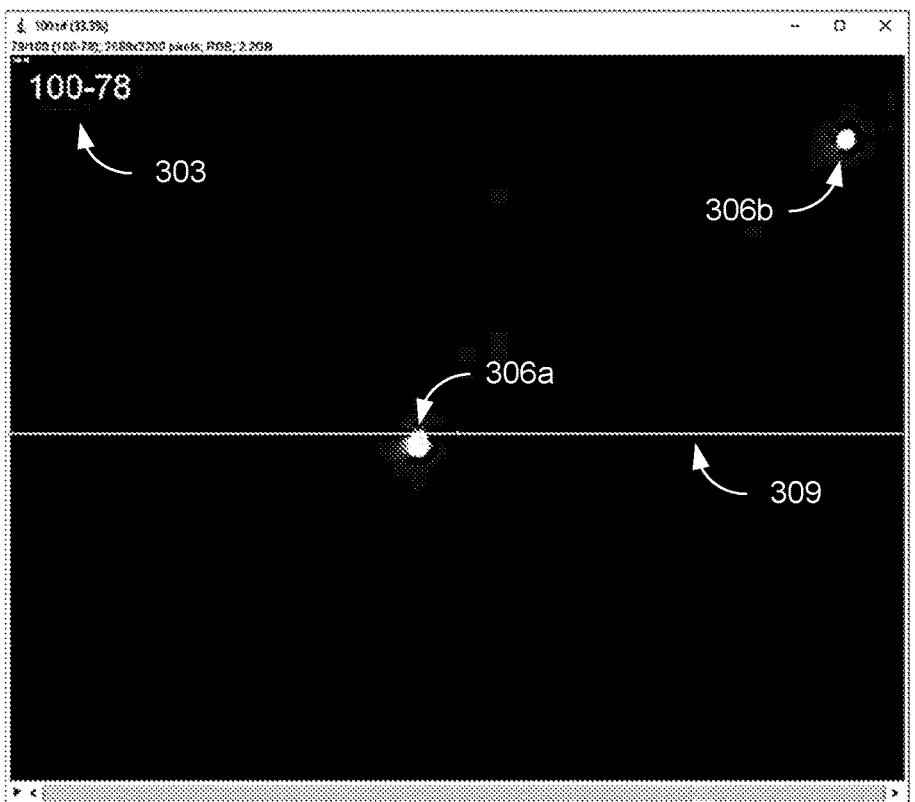

FIGS. 3A-3C show examples of individual frames from a movie generated from the scanned HSI and optical information. FIG. 3A shows the initial frame of the movie, which includes initial optical image with a time stamp or series number ("100-0") 303 identifying the frame. The image in the frame shows a sample element 306 (e.g., a micro bead or particle) as it moves through the imaging window. A line 309 can represent the slit of the hyperspectral imaging camera. As the element 306 moves in and out anywhere along the slit line 309 it will be recorded hyperspectrally. It will be stored in the HSI datacube which can be referenced by the time stamp or series number and pulled up for analysis. A play/pause button 312 can be used to view the movie showing the movement of sample elements 306 in the imaging window. At any time, the user can pause the series of frames. The bar 315 along the bottom of the frame allows the user to scroll or step through the frames of the movie or rewind to a desired frame.

FIGS. 3B and 3C show sequential frames (100-77 and 100-78) showing a sample element 306a passing across the slit line 309. A second element 306b is also visible in the frames. In the frame (100-77) of FIG. 3B, the sample element 306a is moving toward the hyperspectral imaging slit but has not reached it yet. As can be seen in FIG. 3B, the element 306a is off the slit line 309 In the frame (100-78) of FIG. 3C, the sample element 306a is imaged as it passes through the slit. As seen in FIG. 3C, the slit line 309 is on the element 306a but on the edge. Accessing the hyperspectral imaging data (HSI datacube) corresponding to the frames (100-77 and 100-78) with a data analysis application allows the spectral information to be examined.

Figure 4A:
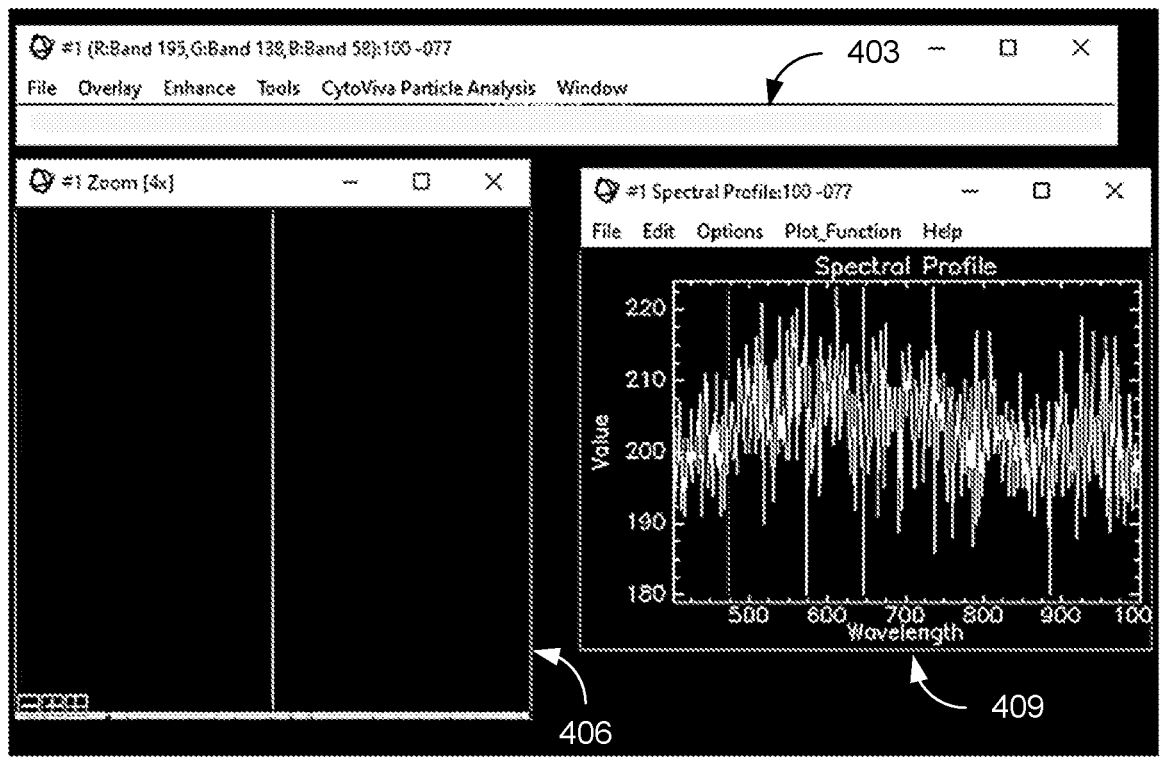
FIGS. 4A-4C are examples of hyperspectral imaging data corresponding to the frames of FIGS. 3B and 3C, in accordance with various embodiments of the present disclosure.
Figure 4B:
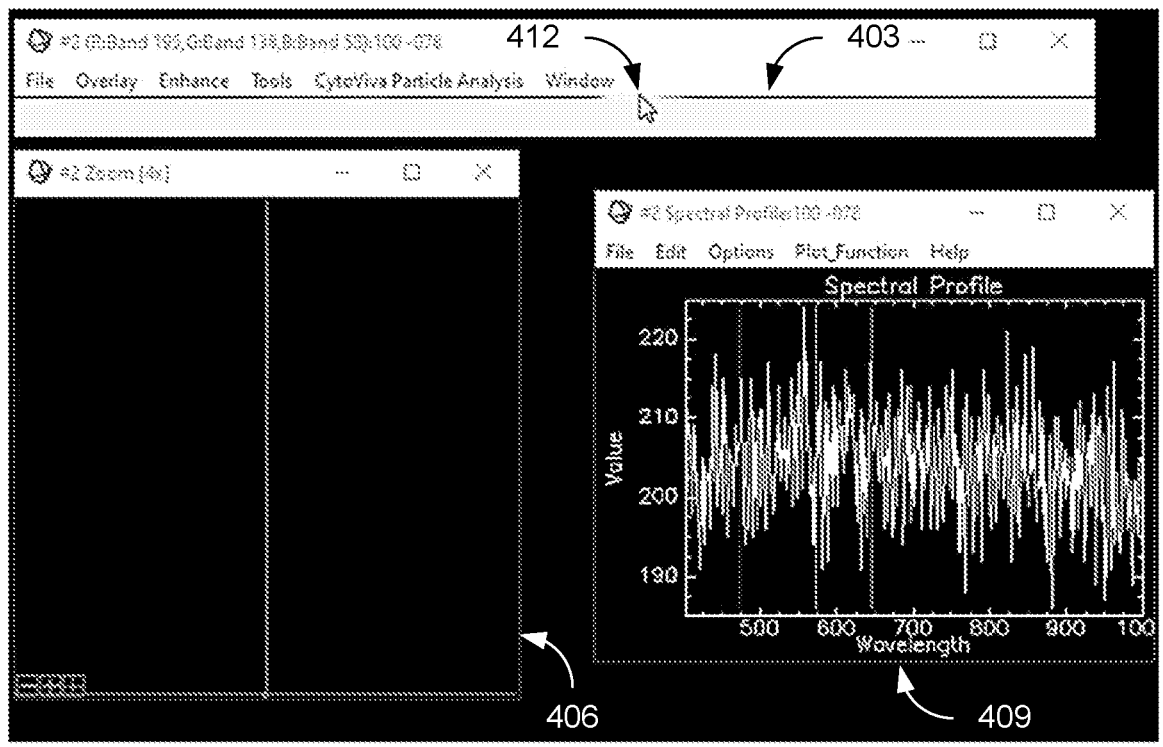
Figure 4C:
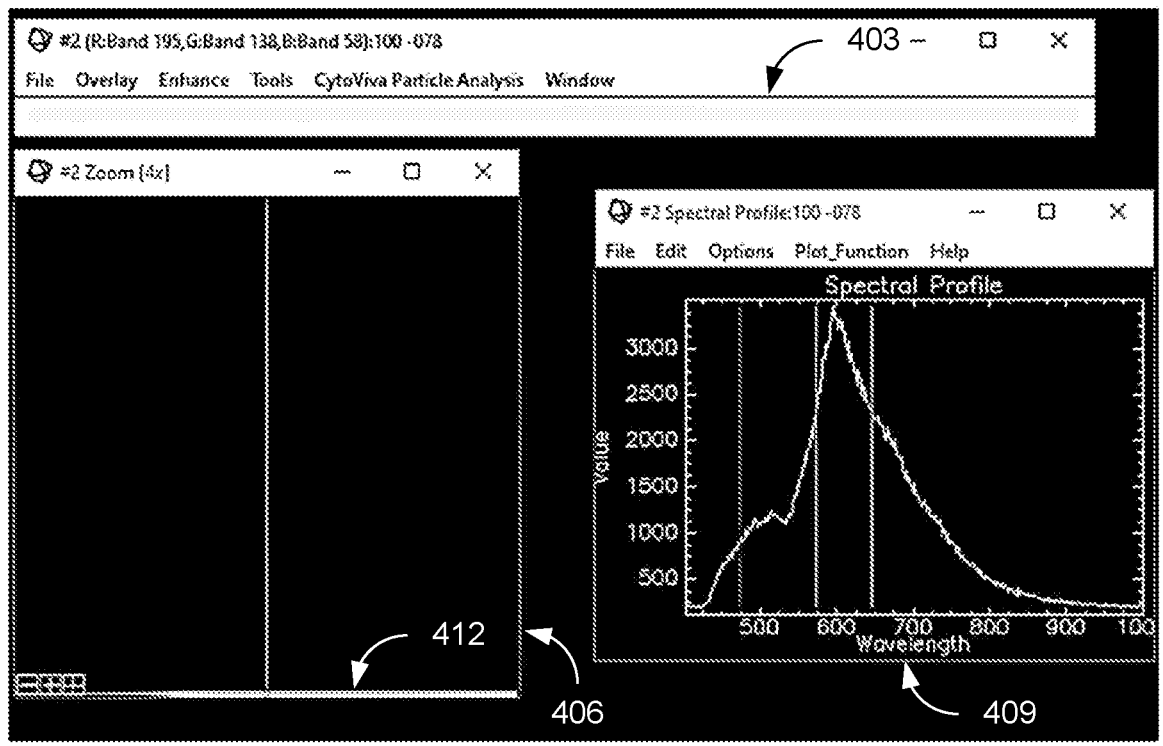

FIGS. 4A-4C illustrate examples of the hyperspectral imaging data for a selected point along the hyperspectral imaging slit. FIG. 4A illustrates an interface for analysis of the HSI data of the frame (100-77) in FIG. 3B. The interface includes a line of HSI data 403 with a bar (or other icon) that can be positioned or moved along the line of HSI data 403 to select a point of the HSI data for analysis. A zoom window 406 can show the HSI data under the bar with the vertical line showing the selected point (or pixel) for analysis. The interface in FIG. 4A can also show the spectral profile 409 for the selected point of the HSI data. Because the element 306a of FIG. 3B is not at the imaging slit, the spectrum only includes noise. By moving the bar along the line of HSI data 403, the user can select the desired point of the slit where a sample element 306 is located.

FIGS. 4B and 4C illustrate the interface for analysis of the HSI data of the frame (100-78) in FIG. 3C. In FIG. 4B, the line of HSI data 403 includes data for the sample element 306a under the slit line 309 of FIG. 3C, which is shown as a white portion 412. In FIG. 4B, a point of the HSI data away from the element 306a is selected as shown in the zoom window 406. As in FIG. 4A, the spectral profile 409 for the selected point of the HSI data only includes noise. In FIG. 4C, the bar has been moved along the line of HSI data 403 to select a point where the element 306a is located for analysis. The zoom window 406 shows the HSI data under the bar with the vertical line located at a selected point (or pixel) of the element 306a. The spectrum for the element 306a at the selected point is displayed in the spectral profile 409. The spectral information can be accessed for subsequent use.

The methodology for hyperspectral imaging of moving microscopic sample elements can be applied to a wide range of applications. For example, when combined with enhanced darkfield microscopy such as that described in, e.g., U.S. Pat. Nos. 7,542,203 and 7,564,623, which are hereby incorporated by reference in their entireties, it can provide the ability to identify nanoscale label free samples. This can include, but is not limited to, engineered nanomaterials used as biosensors for biologicals such as, e.g., circulating tumor cells. It can also be used to spectrally characterize label free nanoscale biologicals such as, e.g., exosomes. In addition, when hyperspectral imaging of moving microscopic sample elements is utilized in conjunction with a directional flow channel, it can enable real time spectral identification of label free biological samples elements (e.g., exosomes, live cells, etc.). Sample elements that meet certain spectral characteristics can be isolated and utilized in clinical therapeutic applications. For example, the methodology can be used to identify differentiating stem cells from non-differentiating stem cells, enabling the ability to isolate and utilize pure stock of differentiating stem cells for clinical therapy.

Figure 5:
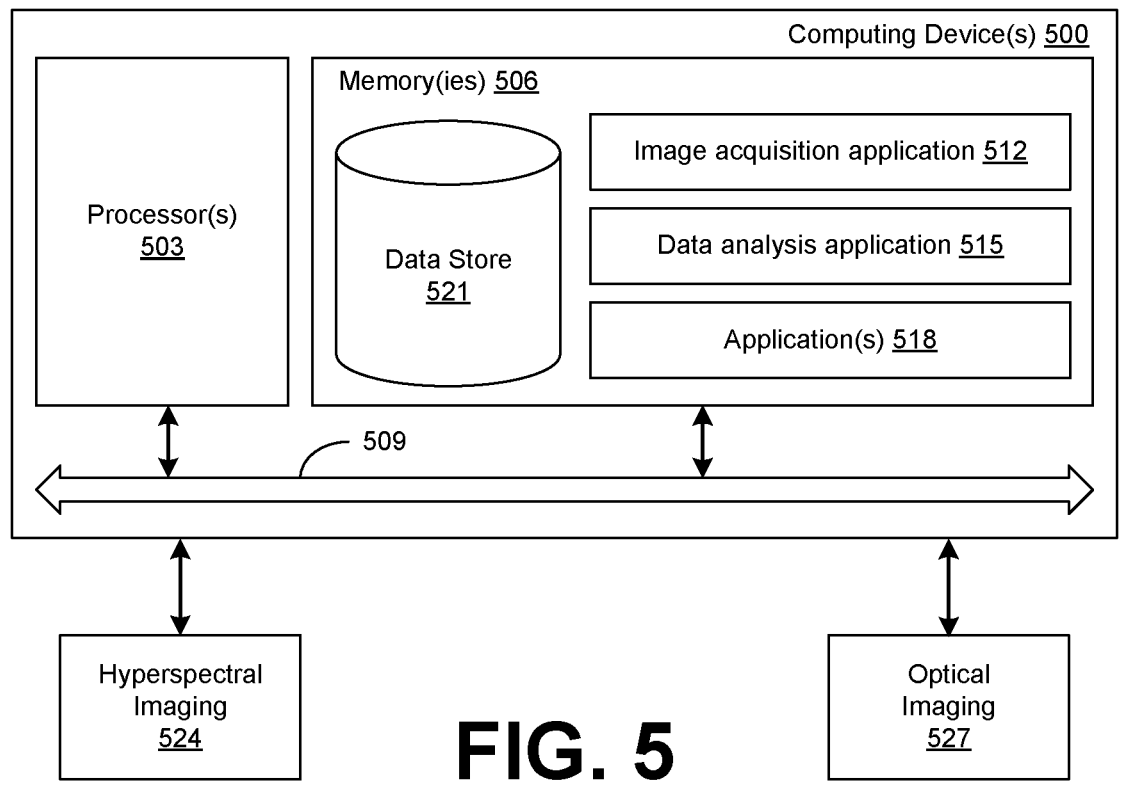
FIG. 5 is a schematic block diagram of a computing device, in accordance with various embodiments of the present disclosure.

With reference now to FIG. 5, shown is a schematic block diagram of a computing device 500 according to an embodiment of the present disclosure. The computing device 500 includes at least one processor circuit, for example, having a processor 503 and a memory 506, both of which are coupled to a local interface 509. To this end, the computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are an image acquisition application 512, a data analysis application 515, and potentially other applications 518. The image acquisition application 512 and/or the data analysis application 515 can implement, when executed by the computing device 500, various aspects of the computational processing as described above with respect to the flowchart of FIG. 1. For example, the image acquisition application 512 can facilitate acquisition and/or storage of acquired hyperspectral and optical images and the data analysis application 515 can facilitate processing of the HSI data. In some implementations, the image acquisition application 512 and data analysis application 515 may be combined in a single application. Also stored in the memory 506 may be a data store 521 including, e.g., recordings, images, video, HSI datacubes and other data. In addition, an operating system may be stored in the memory 506 and executable by the processor 503. It is understood that there may be other applications that are stored in the memory and are executable by the processor 503 as can be appreciated.

A hyperspectral imaging (HSI) device 524 (e.g., a spectrograph) and an optical imaging device 527 (e.g., an optical camera) in communication with the computing device 500 can be utilized to obtain optical images and their corresponding HSI data (e.g., an HSI datacube). Synchronization of each optical image and its HSI data can be coordinated by the image acquisition application 512. For example, the image acquisition application 512 can provide a control signal to initiate acquisition of the optical image and its HSI data to one or both of the HSI and optical imaging devices 524 and 527. The acquired optical image and corresponding HSI data can be stored in memory by the image acquisition application 512 with a time stamp and/or frame number. After capturing and storing the data, the data analysis application 515 can produce the movie or series of frames including the optical and HSI information.

Where any component discussed herein is implemented in the form of software, any one of a number of programming languages may be employed such as, for example, C, C++, C #, Objective C, Java®, JavaScript®, Perl, PHP, Visual Basic®, Python®, Ruby, Delphi®, Flash®, or other programming languages. A number of software components are stored in the memory and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The processor 503 may be of electrical or of some other available construction.

Although portions of the image acquisition application 512, data analysis application 515, and other various systems described herein may be embodied in software or code executed by general purpose hardware, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The image acquisition application 512 and data analysis application 515 can comprise program instructions to implement logical function(s) and/or operations of the system. The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 1 shows a specific order of execution, it is understood that the order of execution may differ from that which is depicted. For example, the order of execution of two or more blocks may be scrambled relative to the order shown. Also, two or more blocks shown in succession in FIG. 1 may be executed concurrently or with partial concurrence. Further, in some embodiments, one or more of the blocks shown in FIG. 1 may be skipped or omitted (in favor, e.g., measured travel times). In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the image acquisition application 512 and data analysis application 515 that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method for hyperspectral imaging, comprising:
   acquiring a series of optical images and corresponding hyperspectral data of a sample, each optical image and its corresponding hyperspectral data acquired simultaneously and identified by a time stamp or sequence number;
   compiling a movie comprising a series of frames each including one of the series of optical images and a slit line indicating a location of a slit for acquisition of the hyperspectral data;
   identifying a frame comprising an element of the sample located on the slit line; and
   analyzing the hyperspectral data corresponding to the optical image in the identified frame, the analysis generating hyperspectral information about the element.

2. The method of claim 1, wherein the element is in motion.

3. The method of claim 1, wherein the hyperspectral data is acquired through hyperspectral imaging through the slit.

4. The method of claim 1, wherein a defined number of optical images and corresponding hyperspectral data is acquired.

5. The method of claim 4, wherein each optical image is acquired over a defined optical exposure time.

6. The method of claim 5, wherein the corresponding hyperspectral data is acquired over a defined hyperspectral imaging (HSI) exposure time.

7. The method of 6, wherein acquisition of each optical image and its corresponding hyperspectral data is initiated simultaneously.

8. The method of claim 1, wherein the hyperspectral information comprises a spectrum of the element.

9. The method of claim 1, wherein analysis of the generated hyperspectral information comprises a spectral profile.

10. A system for hyperspectral imaging, comprising:
a hyperspectral imaging (HSI) device;
an optical imaging device;
at least one computing device comprising a processor and memory; and
at least one application executable on the at least one computing device, wherein when executed, the at least one application causes the at least one computing device to at least:
acquire a series of optical images and corresponding hyperspectral data of a sample, each optical image and its corresponding hyperspectral data acquired simultaneously by the optical imaging device and the HSI device and identified by a time stamp or sequence number;
compile a movie comprising a series of frames each including one of the series of optical images and a slit line indicating a location of a slit of the HSI device for acquisition of the hyperspectral data; and
analyzing the hyperspectral data corresponding to the optical image in a frame comprising an element of the sample located on the slit line, the analysis generating hyperspectral information about the element.

11. The system of claim 10, wherein the HSI device is a spectrograph.

12. The system of claim 10, wherein the hyperspectral data is acquired through hyperspectral imaging through the slit.

13. The system of claim 10, wherein the optical imaging device is a camera.

14. The system of claim 10, wherein a defined number of optical images and corresponding hyperspectral data is acquired.

15. The system of claim 10, wherein the corresponding hyperspectral data is acquired by the HSI imaging device over a defined HSI exposure time.

16. The system of claim 15, wherein each optical image is acquired by the optical imaging device over a defined optical exposure time.

17. The system of 16, wherein acquisition of each optical image and its corresponding hyperspectral data is initiated simultaneously.

18. The system of claim 17, wherein the HSI imaging device triggers the optical imaging device for simultaneous acquisition of the optical image.

19. The system of claim 9, wherein the hyperspectral information comprises a spectrum of the element.

20. The system of claim 9, wherein analysis of the generated hyperspectral information comprises a spectral profile.

* * * * *